UNITED STATES PATENT OFFICE.

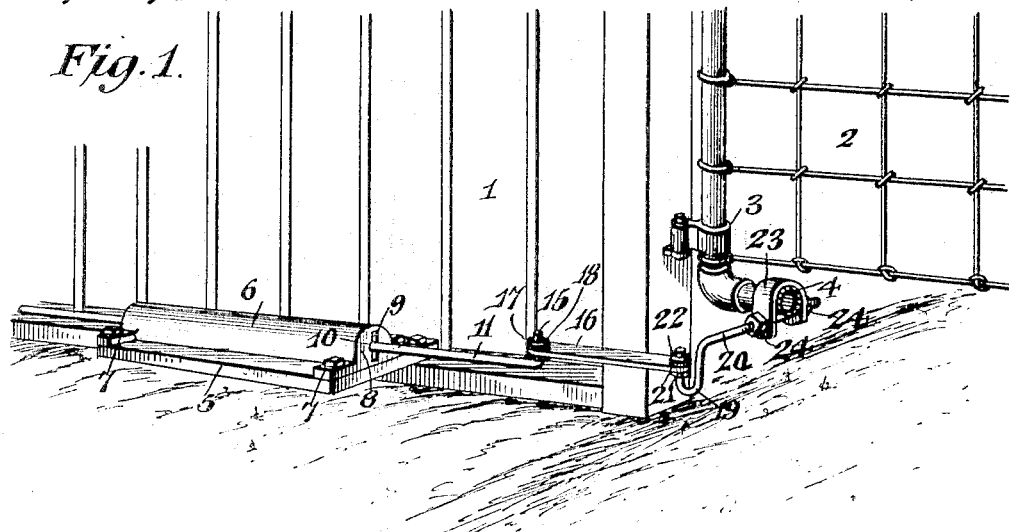

FRANK PEZDIR, OF NORTH CHICAGO, ILLINOIS.

AUTOMATIC SPRING FOR DOORS AND GATES.

1,258,451.      Specification of Letters Patent.      Patented Mar. 5, 1918.

Continuation of application Serial No. 123,750, filed October 4, 1916. This application filed June 7, 1917. Serial No. 173,344.

*To all whom it may concern:*

Be it known that I, FRANK PEZDIR, a citizen of the United States, residing at North Chicago, in the county of Lake and State of Illinois, have invented a new and useful Automatic Spring for Doors and Gates, of which the following is a specification.

This invention has reference to automatic springs for doors and gates, and its object is to provide a spring structure for maintaining a door or gate in the closed position, and which structure is free from liability of harm from weather or other conditions, and, moreover, may be so cheaply constructed as to permit of its use where a more expensive structure would be prohibitive on account of its cost.

In accordance with the present invention there is provided an elongated casing closed at the ends and open along one long side, and there provided with attaching ears or lugs, the ends of the casing having diametric slots therein with passages intermediate of the length of the slots serving as guides for a rod. Within the casing there is lodged a spring in surrounding relation to the rod, and this spring, which may be effectively, if not actually, a one length coiled spring, is of sufficient length to abut the inner faces of the ends or closures of the casing. The rod is traversed by pins spaced apart by a distance about equal to the length of the interior of the casing, and on the rod are washers bearing against the pins and in turn abutted by the ends of the spring. The rod is of sufficient length to permit it to be moved lengthwise of the casing without either end of the rod entering the casing, and the pins holding the spring are so located as to readily pass from the interior to the exterior of the casing through the slots in the ends of the latter.

The rod is provided at one end with connections for attachment to a gate or door, with such connections so arranged as to maintain the rod in a position permitting the pins to pass through the slots, but preventing any turning of the rod which would permit the pins to assume any other position than lengthwise of the slots.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a perspective view of a small portion of a fence and a gate with the invention applied.

Fig. 2 is a longitudinal diametric section of the spring casing showing the rod and spring in elevation.

Fig. 3 is a section on the line 3—3 of Fig. 2, but drawn on a larger scale.

Fig. 4 is a perspective view of a small portion of the spring and rod carrying it, and showing one of the traversing pins and interposed washer.

Fig. 5 is a view similar to Fig. 2, but showing a modification of the invention.

Referring to the drawings there is shown in Fig. 1 a portion of a fence 1 which may be considered as indicative of any suitable type of fence, and in the same figure there is shown a portion of a gate 2 with one of its hinges 3, and also indicating a small portion of a bottom rail 4 forming part of the gate. The gate and fence may be taken as representative of a door and a wall to which the door is attached, since the invention is applicable to either a door or a gate, but for convenience of illustration and description the invention will be considered as applied to a gate, since the invention is particularly applicable for out door use where a spring needs protection from the elements.

Fast to the fence is shown a support 5 which may be as indicated, or may be formed in any suitable manner.

Mounted on the support 5 is a casing 6, shown as partially cylindrical, and this casing is sufficiently elongated for the purposes of the invention. Near each end the casing is provided with oppositely directed outstanding ears 7 which may be conveniently cast in one piece with the casing, since the latter is well adapted to be formed by casting, and as cast iron is particularly resistant to weather conditions, it may be considered that the casing with its ears 7 is a one-piece structure of cast iron. The casing is provided with a bottom opening extending for nearly the length of the casing and as wide as the interior of the casing. At each end the casing is provided with a wall or closure 8 having a slot 9 therethrough extending diametrically of the end of the casing to the outer wall of the casing and to within about the same distance of the open face of the casing. Ordinarily the support 5 is set approximately horizontal, so that the casing may rest about level with the closed face of the casing constituting the upper face thereof and the open face located at the bottom of the casing. In order that the casing may shed water and the like, the top wall is made rounded conforming to the generally cylindrical shape of the casing.

Each slot 9 about midway of its length is circularly enlarged, as indicated at 10, so that the walls of the enlargement constitute a guide and bearing for a rod 11, which latter in the event of the enlargements 10 of the slots 9 being circular is round in cross-section, and for purposes of manufacture on a cheap scale such formation is to be preferred. This, however, does not preclude making the passages 10 of other than circular shape, and the rod 11 of a cross-section conforming thereto.

The rod 11 is considerably longer than the casing, so that its ends project through the offset ends of the casing and extend an appropriate distance beyond such ends.

Within the casing the rod 11 is surrounded by a spring 12 shown as a helical spring, and as in the operation of the gate and spring the latter is subjected to compressive forces, it is not necessary that the spring be a one piece structure, although it is usually so made, and even if made of two or more pieces is effectively a one piece structure.

The spring is of such length that to lodge it within the casing it must be compressed to some extent. On the rod 11 within the casing are washers 13 located between the ends of the spring and the corresponding ends or heads 8 of the casing. The slots 9 are quite narrow, and hence the washers being round, or at any rate considerably wider than the width of the slots, constitute abutments for the spring. The rod 11 is traversed outside the washers by pins 14 small enough both in diameter and length to pass easily through the slots 9, and when the parts are at rest, these pins may be located within the slots 9.

One end of the rod 11 is bent at an angle, as shown at 15, and there pivotally receives one end of a link 16, said link being held to the rod by washers 17 and a pin 18 traversing the rod near the free end of the bent or angle extremity of the rod. This permits pivotal movements of the link 16 on the rod without chance of the link escaping from the rod, and also with the link held from turning about a longitudinal axis correspondingly preventing the rod from turning about its longitudinal axis, since the link and rod are parallel.

The other end of the link 16 is pivotally mounted on one leg of a hook 19 formed on one end of a rod 20. The leg of the hook 19 traversing the link is held thereto by washers 21 and a pin 22 like the washers 17 and pin 18.

The rod 20 at the end remote from the hook is suitably screw-threaded and traverses a U clip 23 applied to the bar 4 to straddle the latter, while nuts 24 applied to the threaded end of the rod 20 on opposite sides of the clips 23 clamp the latter about the bottom bar 4 and thus firmly hold the rod 20 to the bottom bar in such manner that the rod 20 will at all times remain in substantially perpendicular relation to the length of the bottom bar 4.

The parts are initially adjusted so that when the spring 12 is centralized in the casing 6 the gate 2 is in the closed position. If, now, the gate be swung to one side or the other, the rod 20 will swing correspondingly and thereby, through the link 16, moving the rod 11 lengthwise of the casing 6. Whichever be the direction of movement of the rod one or the other of the pins 14 and washers 13 will cause the rod to compress the spring, the other washer abutting the opposite head 8 of the casing, thereby preventing the corresponding end of the spring from moving, while the adjacent pin 14 travels through the slot 9 and to the exterior of the casing, but always maintaining its proper relation to the slot 9, so as to move out of the casing through the slot, and when the parts are returned to the central position again entering the slot without striking the walls thereof.

Because of the open bottom of the casing 6 the latter is readily and cheaply cast, and the other parts all being of commercial form and obtainable upon the market already manufactured, except for a small amount of work necessary for assembling, the whole structure is susceptible of being manufactured at a very low price, so as to be sold at a correspondingly low price. Furthermore, the whole structure is particularly resistant to weather conditions, while the spring, which is more liable to damage than other parts, is thoroughly protected from weather conditions.

Because of the reliability and low cost of the structure, it is particularly valuable for use in connection with farm gates and the like, where the reliability of the device and the low price at which it may be sold is conducive to the use of the device.

In Fig. 5 there is shown a casing 6ª with closed ends 8ª, except that the ends have alined holes 10ª for the passage of the rod 11.

Two springs 12ª surround the rod 11 and each abuts at one end against a respective one of the ends 8ª. The adjacent ends of the springs 12ª engage washers 13ª between which the rod 11 is traversed by a pin 14ª. The action of the structure of Fig. 5 is similar to that of the structure of the other figures of the drawing.

This application is a continuation of my application No. 123,750, for automatic spring for doors and gates, filed October 4, 1916, in so far as the two applications cover the same subject-matter.

What is claimed is:—

1. The combination with a hinged closure, of an automatic spring constraining-structure therefor, comprising an elongated casing open along one long side and having closed ends each with a diametrically elongated passage therethrough with an intermediate enlargement constituting a guide and bearing, a rod extending through the casing and through and beyond both ends thereof and traversing the guiding bearings formed by the enlargement of the passages in the ends of the casing, pins traversing the rod in position to be normally housed in the passages, washers on those sides of the pin toward the interior of the casing, a spring surrounding the rod within the casing and abutting the washers, and connections between one end of the rod exterior to the casing and the hinged closure, said connections being attached to the rod to hold the latter from turning about its longitudinal axis, whereby the pins traversing the rod always maintain the same relation to the passages whether within the latter or moved therefrom.

2. A spring structure for a gate or other closure provided with a bottom rail, comprising an elongated casing having means for fastening it in place, and provided with openings at the ends, a rod extending axially through and beyond both ends of the casing through the openings at the ends thereof, with one end of the rod bent at substantially right angles thereto, spring means on the rod within the casing and extending to both ends thereof, a link traversed at one end by the bent end of the rod, another rod having an end bent at substantially right angles thereto and traversing the other end of the link, with the end of the rod remote from the bent end screw threaded, a clip for affixing the second-named end of the rod to the bottom rail of the gate and traversed by the threaded end of the rod, and nuts on the threaded end of the rod for binding the clip to the bottom rail of the gate.

In testimony, that I claim the foregoing as my own, I have hereto affixed my signature in the presence of two witnesses.

FRANK PEZDIR.

Witnesses:
  NEWTON E. FINN,
  A. D. BOTSFORD.

Copies of this patent may be obtained for five cents each, by addressing the "Commissioner of Patents, Washington, D. C."